Figure 1:
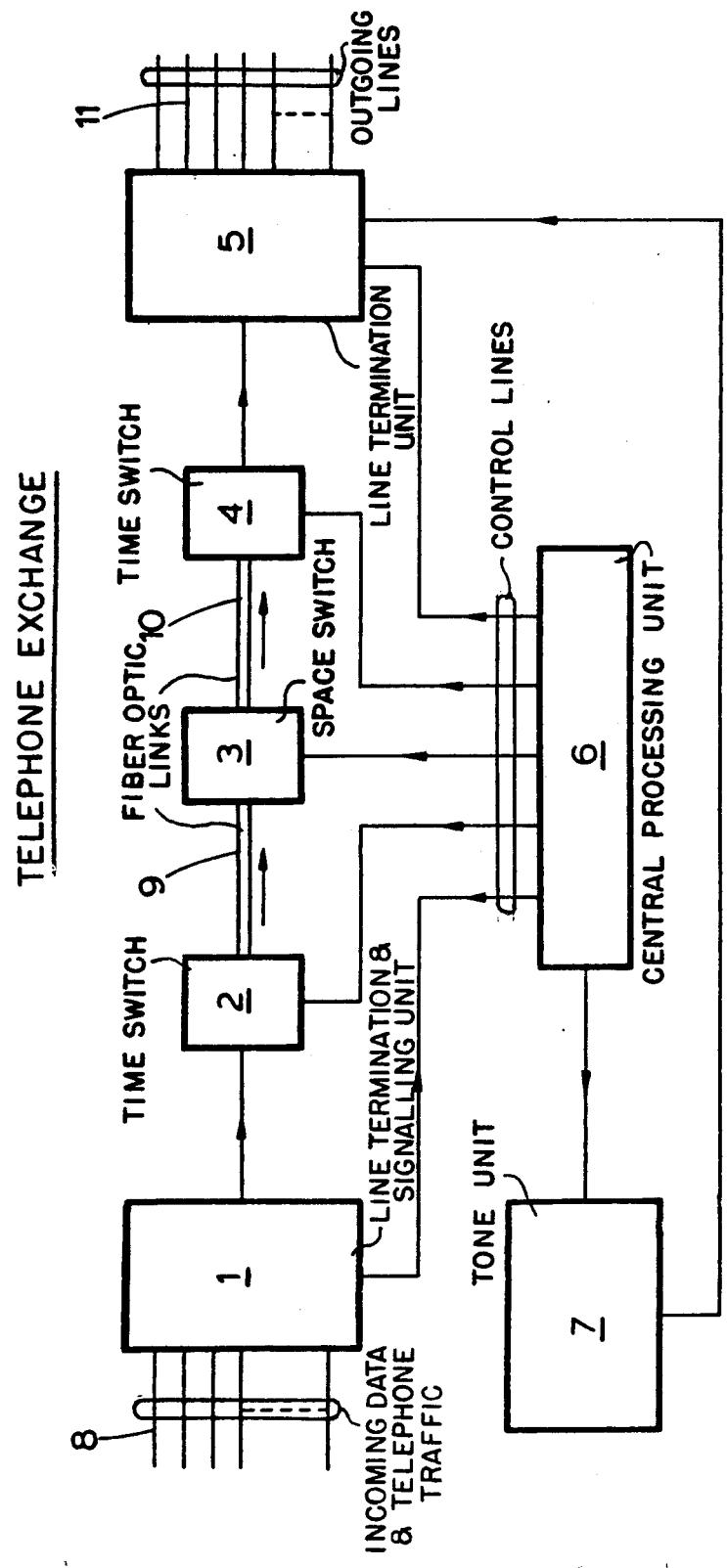

United States Patent [19]
Hensel et al.

[11] Patent Number: 4,468,765
[45] Date of Patent: Aug. 28, 1984

[54] ELECTRONIC TELEPHONE EXCHANGES AND OPTICAL FIBER LINKS FOR USE THEREIN

[75] Inventors: Paul C. Hensel; Raymond C. Hooper, both of Suffolk, England

[73] Assignee: British Telecommunications, London, England

[21] Appl. No.: 291,505

[22] Filed: Aug. 10, 1981

[30] Foreign Application Priority Data

Aug. 18, 1980 [GB] United Kingdom ............... 8026906

[51] Int. Cl.$^3$ .............................................. H04B 9/00
[52] U.S. Cl. ..................................... 370/1; 455/612; 370/63
[58] Field of Search ................ 370/3, 4, 1, 63; 350/96 R, 96 B, 96.2, 96.23, 96.29, 96.31; 455/612

[56] References Cited

U.S. PATENT DOCUMENTS

| 3,663,822 | 5/1972 | Uchida | 350/96 R |
| 4,033,667 | 7/1977 | Fleming | 350/96 WG |
| 4,101,737 | 7/1978 | Philip | 370/63 |
| 4,178,483 | 12/1979 | Lager et al. | 370/63 |

FOREIGN PATENT DOCUMENTS

2427351 1/1976 Fed. Rep. of Germany .
1559837 1/1980 United Kingdom .

OTHER PUBLICATIONS

"Wide-Band Optical Communication Systems: Part 1—Time Division Multiplexing" by Kinsel, Proceedings of the IEEE, vol. 58, No. 10, Oct. 1970, pp. 1666–1683.

"Designers Guide to Fiber Optics" by Kleekamp et al., the Mitre Corporation, 1978.

P. F. Checcacci, "Short Distance Application of Optical Fibres in Italy", Alta Frequenza, vol. 48, No. 2, 1979, Milano, pp. 52–56.

S. Takeuchi et al., "Development of Basic Components for Optical Video System", NTC Conference Record, vol. 2, 1979, New York, pp. 37.5.1–37.5.5.

S. C. Kitsopoulos: "Elements of Light Wave Communications Over Fiber Guides", Bulletin DES Schweizerischen Elecktro-Technischen Vereins, vol. 68, No. 19, 1977, pp. 268–274.

R. W. Blackmore et al., "8,448 M Bits Optical Fibre System", 1st European Conference on Optical Fibre Communication, Sep. 1975, London, pp. 182–184.

T. Takagi et al., "Development of an Intrastation Optical-Fiber Data Transmission System for Electric Power Systems: IEEE Transactions of Power Apparatus and Systems, vol. PAS-99, No. 1, Jan.–Feb. 1980, New York, pp. 318–326.

*Primary Examiner*—Douglas W. Olms
*Attorney, Agent, or Firm*—Cushman, Darby & Cushman

[57] ABSTRACT

An electronic telephone exchange of the type employing time-space-time switching, has an optical fiber data link connecting the space and time switches. In order to meet the design requirements for use in a telephone exchange, the fiber optic link has to have fairly well defined performance parameters. In particular the overall diameter of the optical fibers employed in the optical fiber link lies between 180 and 250 microns, preferably 200 microns, and the core diameter of the optical fibers lies in the range 0.6 to 0.95 of the cladding diameter. Preferably the core diameter lies in the range 160–180 microns. The optical fiber link is characterized by the numerical aperture of the fiber, insertion loss of the fiber, sensitivity and dynamic range of detector, and the power output and extinction ratio of the transmitter.

17 Claims, 7 Drawing Figures

TRANSMITTER

RECEIVER

ELECTRONIC TELEPHONE EXCHANGES AND OPTICAL FIBER LINKS FOR USE THEREIN

The present invention relates to electronic telephone exchanges and optical fiber data transmission links for use therein. Preferably the electronic telephone exchanges are of the type employing both space and time switching, and the said optical fiber links are employed to transmit data between the time switch and space switch.

In one configuration of electronic telephone exchange in which both data and voice signals in digital form are switched, the actual switching operation is accomplished by means of a time switch connected to a space switch which in turn is connected to a time switch. This form of switching is known as time-space-time switching. The basic elements of an exchange of this type are well known to those skilled in the art, and only a brief reference will be made in this specification to the overall architecture and operation of such a telephone exchange.

To appreciate the advantages of the present invention, it is necessary to consider the quantity of data in digital form which must be transferred between the units in a time-space-time switch.

A switch employing this technique uses time switches which can handle 32×2 Mbit/s pcm systems and which are duplicated for security. An unduplicated time switch occupies one shelf.

The space switch size is dependent on the exchange size and occupies one or more shelves depending on the size of exchange.

Each time switch is required to transmit 32×2 Mbit/s to the space switch and to receive a similar quantity of switched data or speech.

In a practical system extra data may need to be transmitted to or from a space switch to include parity and space switch control information. This may add 50% to the amount of data transmitted between the space switch and time switch.

A 3000 Erlang exchange, which may be considered to be a typical trunk exchange has to terminate about 300 pcm systems, and this requires 10 time switches and the matching space switch equipment duplicated for security. Thus each unsecured space switch is required to receive 300×2×1.5=900 Mbit/s of data and to transmit a similar amount.

It should be noted that the data rate transmitted from one time switch to the space switch is 32×2×1.5=96 Mbit/s. A similar amount will be transmitted in the other direction. A single wire pair can handle up to about 2 Mbit/s. Thus a total of 900 wire pair connections must be made to the space switch itself. Each of these wire pairs requires a drive circuit at one end and a receiver unit at the other. It is thus apparent that a major obstacle to capatilizing on the small size of modern electronic components is the number of physical wire connections and associated electronics required for the time-space switch trunking. There is a clear advantage to be obtained from an alternative technique to wire pairs for transferring data within an electronic telephone exchange, especially between time switches and space switches, if the number of connections which has to be made is thereby reduced.

There are many techniques by which digital signals having high data rates can be transmitted. However all such systems must overcome formidable hurdles before they can provide satisfactory performance in a telephone exchange.

The present invention seeks to overcome the data transmission problems between space and time switches in a telephone exchange by employing a fiber optics transmission medium. The use of optical fibers in telephone exchanges has been suggested previously, see U.S. Pat. No. 3,663,822, but only in an extremely general sense. The present invention is directed to the detailed structure of one form of fiber optic systems for use in telephone exchanges, which it is believed has clear technical and economic advantages over the use of wire pair connections. There is nothing to suggest that the solution in U.S. Pat. No. 3,663,822 has such advantages. However before this approach can be regarded as a solution to the problem, the cost of such fiber optic links may be reduced to less than the cost of wire pair connections. Optical fiber links could in theory have extremely high data rates, however by simply aiming for the highest possible data rate, the price of the data links would become unacceptably high. The data link of the present invention is therefore designed with the idea of permitting data transmission at a rate of up to 100 Mb/s, preferably only up to 50 Mb/s. By choosing this value for the data rate it has proved possible to design a system whose cost compares favorably with the cost of wire pair systems. Given a set of fiber optic links interconnecting the space switch and time switch of an electronic exchange, each link carrying 32 Mb/s traffic data (higher data rates are actually transmitted because of the needs to transmit signal and clock information) the 512 wire pair connections referred to above can be replaced by 32 fiber optic links. Bearing in mind the small physical dimensions of optical fiber this represents a very considerable saving in the number of connections, total volume occupied by connections, and weight of connections.

To implement the system outlined above requires a low cost solution to be found to the design problem of the data link.

It should be noted that fiber optic data links have been designed for use in computers. A typical example of such a data link is the HFBR data link. This data link employs a 140 micron diameter clad fiber having a 100 micron diameter core. It is capable of transmitting data at a rate of 10 Mb/s and has a bandwidth of 20 MHz.Km. The receiver dissipates 300 mW of power and the transmitter dissipates 500 mW of power. Finally the cost of the unit is not competitive in comparison with the cost of wire pair connections. A unit of this type is quite adequate in terms of performance for many applications especially in equipment such as computers which have forced air cooling units to maintain reasonable ambient temperatures. However a unit of this type cannot be successfully used in the exacting environment of an electronic telephone exchange, which ideally relies on natural convective cooling because:

1. The data transmission rate is too low
2. The unit cannot be operated over links longer than 100 meters— (200 meters is estimated as a typical maximum length required for connecting links in an electronic telephone exchange)
3. The power dissipation is far too high
4. The cost of the unit is too high
5. The packing format (ie the way the link is designed with connections built into the electronics) is not flexible. This means that there is no flexibility available as to location of optoelectronic components on electronic mounting cards.

These disadvantages mean that a telephone exchange designer would not consider using existing fiber optic links in a telephone exchange, such as those disclosed in the following articles:

"Development of an Intrastation Optical Fibre Data Transmission System for Electrical Power Systems" by T Takagi ET AL in IEEE and Transactions on Power Apparatus and Systems Volume No. PAS99 part 1 pages 318-326 January-February 1980;

"Development of Basic Components for Optical Video Systems" by S Takuchi ET AL in NTC conference record volume 48 part 2 pages 37.5.1-37.5.5 1979;

or "Short Distance Application of Optical Fibres in Italy" by D F Checcatti in Alta Frequenzsa volume No 48 part 2 pages 52-56 1979.

However it is believed that the present invention overcomes these disadvantages.

By adopting the optical fiber data link solution, for the interconnection problems between space switches and time switches in a digital telephone exchange, it is believed that the following advantages will result:

1. A reduction in the number of connections for a given transmission capacity
2. Immunity of the connections to electro magnetic interference
3. Improved electrical isolation between interconnected units
4. A reduction in both volume and weight of connection links
5. Reduction in power consumption by connection links According to the present invention there is provided a fiber optic link for transmitting digital signals in an electronic telephone exchange including:

(a) a transmitter for converting electrical digital signals into optical signals, said transmitter
  (i) being capable of producing between 0 dBm and −30 dBm of lauch power, and
  (ii) having an extinction ratio of between 0 and 0.3;
(b) a receiver for converting said optical signals into electrical signals, said receiver having
  (i) a sensitivity in the range −40 dBm to −15 dBm
  (ii) a dynamic range between 10 dB and 20 dB, and
  (iii) a power consumption of less than 100 mW; and
(c) an optical fiber linking said receiver and said transmitter, said fiber
  (i) being a multi-mode, optical fiber or either the glass-glass or silica-silica type
  (ii) having an outside cladding diameter of 180-250 microns
  (iii) having a core diameter of 0.6 to 0.95 of the cladding diameter, and
  (iv) having a numerical aperture in the range 0.2-0.5

According to a further aspect of the present invention there is provided an electronic telephone exchange including
  two time switches,
  a space switch,
  a functional connection between each time switch and the space switch such that the switches are arranged to switch voice traffic in a digital format or data in a digital format,
  one or both of said functional connections being at least one optical fiber link as defined in the above paragraph in which the transmitter coverts electrical digital signals into optical signals and the receiver converts said optical signals into electrical digital signals.

Figure 2:
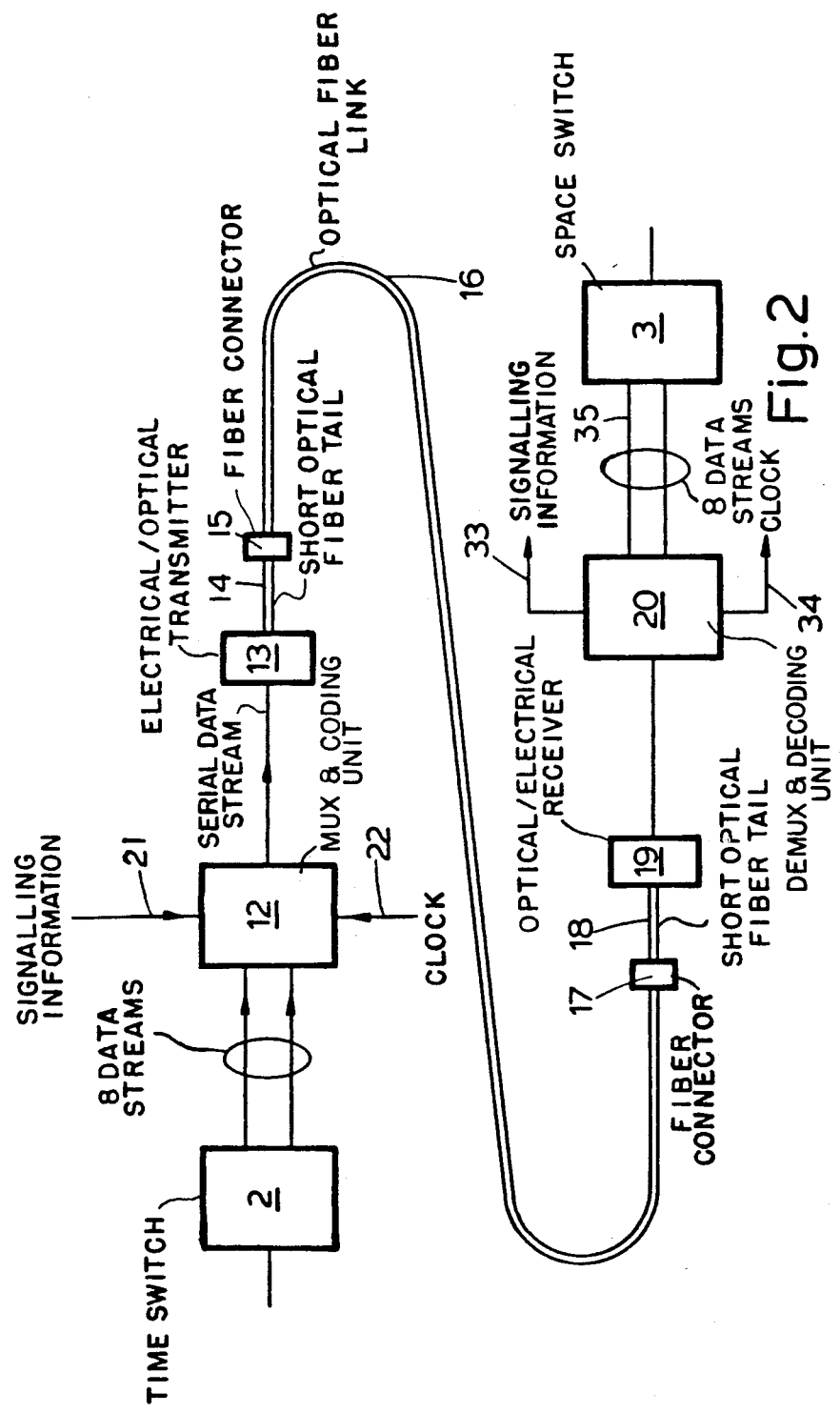
Figure 3:
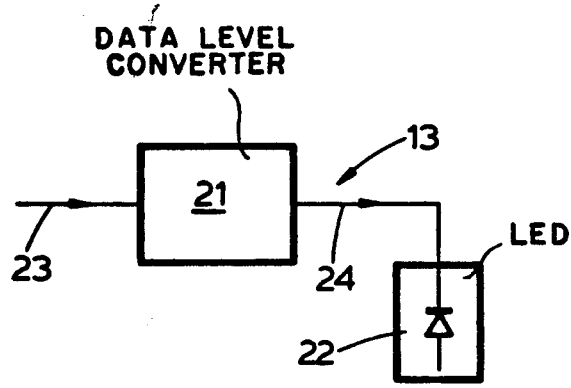
Figure 4:
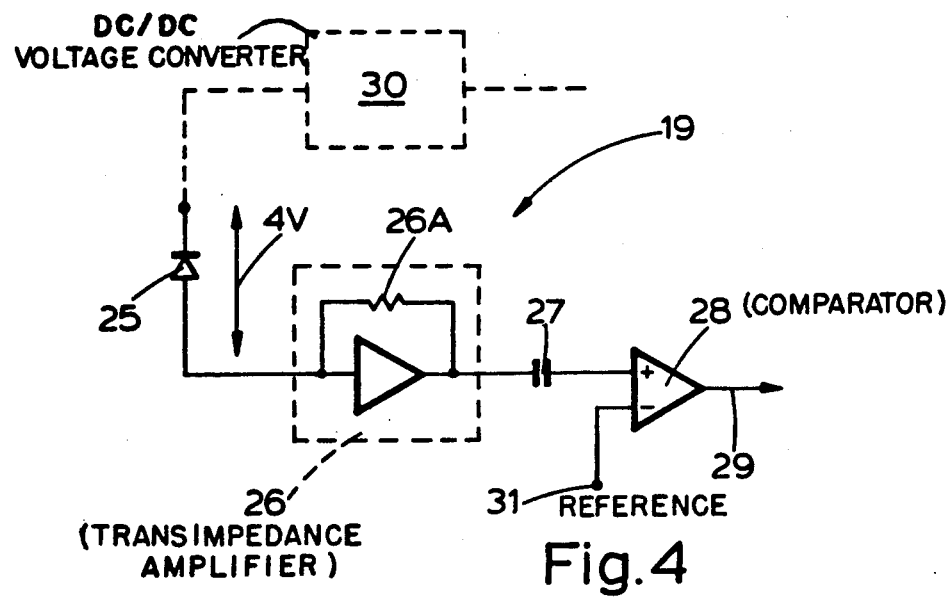
Figure 5A:
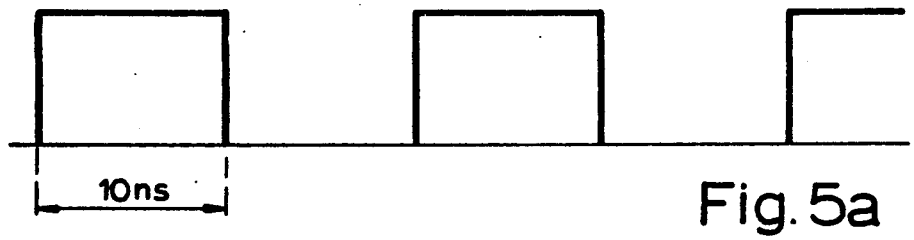
Figure 5B:
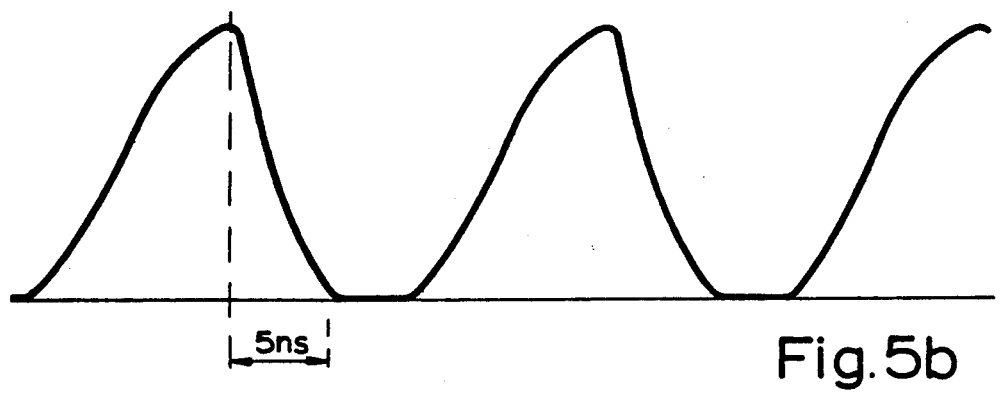
Figure 5C:
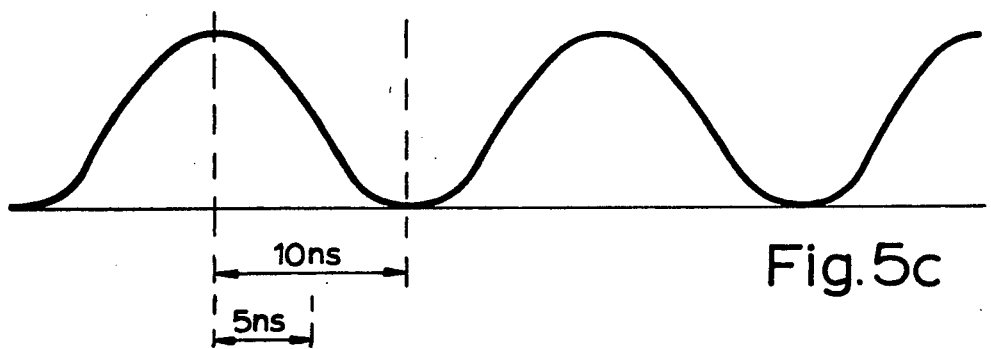

Embodiments of the present invention will now be described by way of example with reference to the accompanying drawings in which:

FIG. 1. Is a simplified diagramatic representation of an electronic telephone exchange according to the present invention;

FIG. 2. Is a diagrammatic representation of a fiber optic link according to the present invention;

FIG. 3. Is a diagram of an optical transmitter for use in the fiber optic link of FIG. 2;

FIG. 4. Is a diagram of an optical receiver for use in the fiber optic link of FIG. 2; and FIGS. 5a, 5b and 5c show wave forms for a signal transmitted over a fiber optic link at various points in the transmission chain.

Referring now to the drawing and FIG. 1 in particular, there is shown a telephone exchange incorporating a fiber optic link between the time switches 2 and space switch 3. The electronic telephone exchange illustrated in the very simplified diagrammatic form in FIG. 1 is of the time-space-time variety. The operation of this exchange will now be briefly described. Incoming telephone and data traffic enters the exchange on lines 8, which terminate on line termination and signalling units 1. The operation of the entire exchange is controlled by a central processing unit 6. The traffic then passes to time switch 2 and then via a fiber optic data link 9 to a space switch 3. From the space switch 3 the traffic is passed by a fiber optic link to a time switch 4. It should be noted that in physical terms the time switches 2 and 4 may be the same block of units. The traffic then passes from time switch 4 to line terminating unit 5 and thence to outgoing lines 11. A tone unit 7 is also provided. It will be understood that the line terminating and signalling units provide an indication to the central processing unit of an incoming call, and its destination. The central processing unit then sets up a path through the telephone exchange interconnecting the incoming calls with the desired outgoing line. Appropriate tones and additional facilities can be provided by means of tone generating unit 7. This form of electronic telephone exchange is familiar to those skilled in the art, and many variations in the detailed architecture can be made. For the purpose of the present invention it is only really necessary to consider in detail the interconnection between the time switches 2 and 4 and the space switch 3. Although the invention is described with reference to the interconnections 9 and 10, it should be realized that the fiber optic links of the present invention may be employed at any point in the telephone exchange where high data rates create problems in the use of conventional wire pair interconnections. Consider a telephone exchange of the type illustrated in FIG. 1 designed to handle approximately 500 erlangs of traffic. The time switches 2 are made up of individual time switch units each of which terminate 16×2 Mb/s pulse code modulated (PCM) systems. Four time switch units operate as a block terminating 64×2 Mb/s PCM systems, and 4 such units occupy 2 shelves of equipment. The space switch unit occupies one shelf of equipment and serves 16 shelves of time switch units. In other words the space switch handles a total of 512×2 Mb/s systems a total data rate of 1,024 Mb/s. In an actual telephone exchange the space switch is triplicated for security. It will thus be apparent that each space switch requires at least 512 wire pairs, each wire pair carrying one 2 Mb/s PCM system interconnected with the appropriate time switch. Each of these wire pairs requires a driver unit associated with a time switch and a receiver unit associated with a space switch in order that it shall operate correctly. It should thus be apparent that there is a major problem in relation to interconnecting time switching units and space switching units in electronic telephone exchanges of the type illustrated in FIG. 1. If the link between the time switches 2 and 4 and space switch 3 are replaced by optical fiber data links 9 and 10, then the 512 wire pair interconnections can be replaced by 32 individual fiber links. This represents a huge saving in complexity, space occupied by wire connections, and electronics associated with driver units and receiver units at each end of the wire pairs. However there are major obstacles to be overcome in the design of the appropriate fiber optic link. Unless such fiber optic links can be produced at a competitive price with respect to the cost of wire pair connections, and unless such cheap optical fiber data links can meet the exacting environmental requirements of a telephone exchange, it is not possible to provide a solution to this problem by the use of fiber optics.

Fiber optic data links have of course been used for a number of years in electronic computers. However such data links are unsuitable for use in electronic telephone exchanges on a number of counts, which have been previously discussed. The obstacle course to be overcome in the design of an appropriate link is daunting.

However, the applicants believe they have arrived at a solution to the design problem.

The physical form of an optical fiber data link according to the present invention is illustrated in FIG. 2. It should be realized that the invention resides in the design parameters of the system, rather than in the physical structure of the system. In the link shown in FIG. 2, the output from time switch 2 is in the form of eight 4 Mb/s data streams. These are passed to a multiplexing and coding unit 12. Signalling information, comprising one 4 Mb/s data stream and a clock comprising a further 4 Mb/s data stream are fed into the multiplexing unit from lines 21 and 22 respectively where they are combined with the data stream entering the unit from the time switch 2. The multiplexing and coding unit converts the data stream into a single serial data stream at approximately 40 Mb/s. This data stream is encoded in Manchester biphase code, which is a low disparity code in which a zero bit is represented by a 01 and a unit bit is represented by a 10. It should be noted that the data rates employed are in fact 4.069 Mb/s and 40.96 Mb/s rather than the approximate figures given above. It should be understood in this specification that data rates are expressed in approximate terms to the nearest integer value in Mb/s. At this point it should perhaps be noted that there is a need to use a line code on the fiber optic link which has a low DC level, because the design of reasonable optical detectors requires the use of AC coupling, and this would severly distort any signal having any appreciable DC components.

The term low disparity is used in this specification to mean a code in which the number of transmitted low levels is approximately equal to the number of transmitted high levels and hence tends to reduce low frequency components in the line signal.

An electrical signal is passed from multiplexing and coding unit 12 to transmitter 13 where the electrical signal is converted into optical form, in the case of the present invention, by a light emitting diode. The light emitting diode is connected by means of a short optical fiber tail 14 to a demountable fiber to fiber connector 15. From connector 15 the signal is transmitted over the optical fiber link 16, which may contain up to one additional fiber to fiber connector, to fibre connector 17. The fiber to fiber connector 17 is connected by a short optical fibre tail 18 to optical receiver 19, which in the case of the present invention is a PIN diode. From the receiver 19 the data, which is now in the form of an electrical signal is passed to demultiplexing and decoding unit 20 from which signalling and clock information is extracted on lines 33 and 34. The data is then passed in the form of 8 binary streams on line 23 to space switch 3.

It should be noted that by employing fiber tails 14 and 18 linked directly to the electronic components of the transmitter and receiver, considerable flexibility in electronic card design is achieved. The presence of these tails enables the electronic components of the transmitter and receiver to be located at any point on a card, not necessarily on the edge of a card. The detail design of an optical fiber link needed in a telephone exchange must meet certain constraints, namely:

1. The power consumption must be low, because ideally natural convective cooling is employed in an electronic telephone exchange, and excess power consumption would result in the need for forced air cooling or even refrigeration which can add considerably to the running cost of the electronic exchange.

2. The total cost of the fiber optic links must be low, because they must be a competitive alternative to wire pair links in order that the capital cost of the electronic telephone exchange should be reasonably low.

3. The transmission rate of the links must be of the order of 50 Mb/s preferably higher.

4. The use of an optical system requires the signal to be coded in a form which has a low DC content in order that the signal will not be excessively distorted by the AC coupling necessary in optical receivers.

5. Because the information is in a multiplexed form in order to adequately capitalize on the high data rate which can be transmitted by the optical fiber link, clock information must also be transmitted, therefore the coding format used must permit clock extraction from the data.

6. The optical fiber links, must be physically small in size both in terms of the actual fiber cable and in terms of the electronic components because of the need to set up a relatively large number of connections.

7. The choice of an optical fiber link automatically eliminates problems from electromagnetic interference and achieves electric isolation between the two points connected by the link.

8. The fiber optic link needs to be able to transmit information up to a distance of 200 meters, with an average length of 20 meters and also needs to be able to operate with substantially back-to-back connections, ie a link length of substantially zero meters.

Because of the need to impose a severe power budget on the operation of the link, it is necessary to adopt an iterative process in terms of the design and consider starting with an assumption on transmitter power, and then determining the design parameters of the other components in the systems. If, starting with given transmitter power, other components are found to have design parameters which cannot be achieved technically, or can only be achieved at very high cost, it is necessary to consider new values of transmitter power and recalculate all the system parameters again. Using this technique it has been determined that at the present time the optimum transmitter power consumption is approximately 75 milliwatts. Of this, 25 milliwatts is used to drive associated electronics and 50 milliwatts is employed to drive the LED via a drive transistor. In fact only 10 mW is dissipated in the L E D, which has an efficiency of approximately 0.1% in terms of power launched into an optical fiber. This means that the output power of the transmitter for optimum performance is approximately −20 dBm. It is believed that viable system operation can be obtained with launch powers between zero dBm and −30 dBm, but −20 dBm is the preferred value.

This optical power must be transmitted through a 200 meter length of optical fiber, containing up to 3 fiber to fiber connectors. For optical fiber lengths up to rather more than 200 meters in length, the power actually transmitted by an optical fiber is dictated by the numerical aperture, fiber diameter, and connector losses rather than fiber insertion loss. It is therefore possible to select a fiber having an insertion loss which is easily and cheaply obtainable. Such a fiber may have an insertion loss of 20 dBm/Km, but should preferably have an insertion loss of 10 dBm/Km or less. Fiber having this sort of insertion loss can be made relatively easily and cheaply by a double crucible technique.

The core diameter of the fiber is a compromise between competing parameters. If a large core diameter is used, it simplifies the problem of designing fiber to fiber connectors and enables cheap fabrication techniques to be used for such connectors thereby reducing their price. Furthermore large core diameter fibers are capable of increased power transmission. On the other hand the overall fiber diameter must not be too great because this adversely affects the ability of the fiber to bend. For the relatively confined spaces available inside the telephone exchanges it is believed that the fiber must be capable of bending to a radius of 20 millimeters. Given the known strength of optical fibers, it is reasonable to choose a fiber diameter which will impose approximately one half percent strain at maximum bending, ie 20 millimeters radius of curvature and also be capable of withstanding 1% strain proof testing in order that bending should not induce failure after testing. Optical fibers meeting this criteria have outside diameters not exceeding 200 microns. Given the advantages of having large diameters this fixes the optical fiber at approximately 200 microns. It is believed that some variation in this diameter value is tolerable and that fibers having outside diameters between 180 and 250 microns are usable, although the preferred outside diameter is 200 microns.

Having determined the outside diameter of the fiber, the core diameter is directly determined. The factors which determine the core diameter in relation to outside diameter are the need to:

1. minimize micro bending in the optical fiber which pushes up fiber loss
2. minimize the quantity of power transmitted at the cladding surface.

The first of these limiting factors is the dominant effect. This means that ideally the core diameter should not exceed 0.9 times the cladding diameter, although viable fibers with core diameters up to 0.95 times cladding diameter may be used. The need to use as large a core diameter as possible because of the power transmission requirement means that core diameters substantially less than 0.6 times the cladding diameter should not be used. For an overall cladding diameter of 200 microns, this yields a core diameter of approximately 160 to 180 microns.

Another important fiber parameter which needs to be determined is the numerical aperture of the fiber. The higher the value of the numerical aperture, the more power can be coupled from a LED into the fiber. High numerical apertures are therefore desirable from the point of view of maximizing power transmission. However, as the numerical aperture of a fiber is increased, the bandwidth of the fiber is reduced, and connection problems are introduced in relation to the fiber. High numerical aperture fibers are less tolerant of accidental axial separation of fiber ends in fiber to fiber connectors. Therefore by increasing numerical aperture the losses associated with connectors are also increased.

To transmit a 50 Mb/s signal in Manchester biphase code requires the ability to transmit at a rate of 100 Mb/s, since the coding doubles the data rate. This data must be transmitted over 200 meters of fiber and therefore the 3 dB optical bandwidth of 50 MHz which is required to transmit 100 Mb/s, implies by linear extrapolation a bandwidth of 10 MHz.Km.

Multimode step index optical fiber having a numerical aperture of 0.3 has a theoretical bandwidth of about 5 MHz.km. However perfectly stepped index fiber does not occur in practice, there is always a slight grading of the refractive index distribution present. Experimental results indicate that practical bandwidths in general exceed theoretical values by at least a factor of two. Therefore a numerical aperture of 0.3 should provide the necessary bandwidth of 50 MHz over a 200 meter link. This is a preferred value of numerical aperture for the fiber, but again some range is permissible about this value and it is believed that the numerical apertures between 0.2 and 0.5 may provide useful links. A preferred range of numerical aperture is from 0.25 to 0.35. It should be noticed in this context, that the connector to connector problem is less serious than the problem of coupling a reasonable amount of power from a LED into an optical fiber. Therefore one should ideally work close to the maximum numerical aperture which is permissible in view of the required bandwidth.

As previously discussed the transmitter, ie the LED feeding power into the optical fiber link should be capable of launching −20 dBm of power into the optical fiber. Assuming that the optical fibre is 200 meters long, has an insertion loss of 10 dB per Km and includes 3 fiber to fiber connectors each of which has a loss of 3 dB, the total insertion loss of the 200 meter link will be 11 dB in the worst case. If 4 dB is allowed as an operating margin, the receiver must be sufficiently sensitive to detect −35 dBm. Again allowing for a range of receiver sensitivities to give a viable design, a reasonable range for the receiver sensitivity can be shown to be −40 dBm to −51 dBm, although it must be emphasized that the preferred value is −35 dBm. As previously stated, the optical fiber link, and therefore the receiver must be capable of handling data rates of 50 Mb/s to cope with the expected data rates for the telephone exchange between time switches and space switch. However it is also desirable that the receiver should be able to cope with lower data rates down to a data rate corresponding to that of one telephone channel when encoded in PCM, ie 64 kb/s. This data rate means that the output rise and fall time on the receiver should be 10 ns so that the receiver can adequately cope with the Manchester biphase code at 50 Mb/s. It should be noted that the rise and fall time response of the receiver is not the same as that for the transmitter. The reason for this can be seen in FIG. 5. FIG. 5A shows a continuous train of pulses in Manchester biphase code at 50 Mb/s. It will be seen that a typical pulse width is 10 ns. The transmitter must have a rise and fall time equal to half the pulse width, if the output pulses produced by the transmitter are to come reasonably close to maximum output power of the LED. This can be seen in FIG. 5B which shows the shape of pulses transmitted into the optical fiber. After the pulses have traversed the optical fiber, they will have degraded to the form shown in FIG. 5C. It should be apparent from FIG. 5C that the receiver needs to follow the pulse rate of the received signal which will vary from minimum to maximum over a period of approximately 10 ns. Therefore the rise and fall time for the receiver is somewhat relaxed in comparison with that of the transmitter and need only be 10 ns.

Turning back to the general characteristics of the receiver, it should be noted that the power consumption figure for the receiver for the particular design described here should not exceed 50 mW. This can be readily achieved. PiN diodes which are used as the receiving elements in the receiver, have substantially zero power dissipation (25 microwatts) therefore the power consumption of the receiver is dictated entirely by the associated electronics.

Since the entire output from the transmitter is −20 dBm, and the receiver sensitivity is −35 dBm, the receiver must have dynamic range of 15 dB if it is to be able to operate at the end of 200 meters via the optic links, and also operate at the end of an optical link of substantially zero length, ie in the back to back operating configuration.

A typical receiver circuit design is illustrated in FIG. 4 in which the actual receiving element 25 is a PiN diode which in normal operation would have 4 volts dropped across it, 26 is a transimpedance pre-amplifier, 27 is a AC coupling capacitor, and 28 is a comparator. The transimpedance amplifier is necessary to boost the output from the PiN diode. The feedback resistor 26A is sufficiently high to
(a) ensure adequate drive to the following comparator 28 and
(b) contribute low thermal noise to achieve the −35 dBm receiver sensitivity.

The comparator 28, compares the incoming line signals with a locally generated reference signal on line 31 so that it acts as a waveform shaping circuit. The output from the comparator 28 on line 29 is a Manchester biphase signal, structurally identical to the optical signal transmitted into the optical fiber link. In certain circumstances it may be found that 4 volts is insufficient to enable a PiN diode to operate at maximum performance. This can cause problems when other electronic components have been designed to operate on a standard 5 volt supply. In certain circumstances, therefore, it may be necessary to boost the voltage supply to the PiN diode by means of a DC to DC converter 30 shown in FIG. 4 in dotted outline.

Turning now to the operation of the transmitter. The physical structure of the transmitter circuit is extremely simple, and is shown in FIG. 3. It consists of a data level converter 21, fed by a Manchester biphase coded signal on line 23. The data level converter converts the incoming data to current pulses which are fed by line 24 to the LED 22. Typical peak values of the current drive pulses on line 24 are 20 mA.

It is normally possible to operate an LED so that the zero level corresponds to no light emission. However there are certain speed advantages which can be obtained in operation by applying a small voltage to the LED. This means that there is a small continuous light emmission from the LED. In the present optical link, it has been found that peak performance requires an extinction ratio of 0.05 ie the ratio between minimum light emission and maximum light emmission. The acceptable range of extinction ratios for the transmitter is from zero to 0.3, however 0.05 is the preferred value. It should be noted that the extinction ratio of 0.05 represents less than ½ dB penalty in terms of loss of modulation and this has certainly proved to be acceptable in the present application, in fact a rather higher loss of modulation is acceptable.

The transmitter of course must be capable of handling the data rate for the system, as explained previously with reference to FIG. 5. In particular, the transistor circuitry must have a rise and fall time better than 5 ns in order that data encoded in Manchester biphase code can be transmitted at 100 Mb/s, ie twice the data rate.

As was previously discussed, an overall figure for connector losses was selected as 3 dB per connector. It is relatively easy to achieve connector losses of better than 2.5 dB per connector using simple and robust jointing techniques. It should be noted that the total connector loss consists of a connector loss associated with the operation of the connector itself and an additional loss associated with mismatch between the adjacent fibers. In the present system fiber mismatch loss at connectors does not exceed 0.5 dB per connector. Therefore the overall connector loss of 2.5 dB.

From the foregoing description it can be seen that the detailed design of an optical fiber link according to present invention is extremely complicated. The parameters defining transmitter, receiver, and fiber performance all interact. It is therefore necessary in determining a particular fiber link design to go through an iterative process and ensure that all the parameters for the optical fiber link can be realized at reasonable cost using existing technology. Table 1 is a summary of the key parameters for the optical fiber of the present invention indicating the preferred values, which give what is believed to be an optimum performance, in terms of the cost etc., together with permissible variations of these parameters. It should be emphasized that when the value of one parameter is changed, there will be necessary consequential changes in other parameters. The value of these changes can be determined relatively easily using the design procedures outlined above.

TABLE I

| | Preferred Value | Range |
|---|---|---|
| Transmitter | | |
| Launched Power | −20dBm | 0dBm to −30dBm |
| Extinction Ratio | 0.05 | 0 to 0.3 |
| Data rate | 64K bit/s–50Mb/s | 64kb/s–100Mb/s |
| Power Consumption | 75mw | <75–100mw |
| Receiver | | |
| Sensitivity | −35dBm | −40dBm to −15dBm |
| Dynamic range | 15dB | 10dB–20dB |
| Power Consumption | 50mw | <50mw–100mw |
| Optical Fiber | | |
| Cladding diameter | 200 microns | 180–250 microns |
| Core diameter | 160–180 | 0.6–0.95 Cladding |

TABLE I-continued

|  | Preferred Value | Range |
|---|---|---|
|  |  | diameter |
| Numerical Aperture | 0.3 | 0.2–0.5 |
| Attenuation | 10dB/Km | 3dB/Km–20dB/Km |
| Bandwidth | >10MHz.Km |  |
| Strain Proof Test | 1% |  |

What is claimed is:

1. In an electronic telephone exchange, a fiber optic link for transmitting digital signals including:
   (a) a transmitter for converting electrical digital signals into optical signals, said transmitter
      (i) being capable of producing between 0 dBm and −30 dBm of launch power, and
      (ii) having an extinction ratio of between 0 and 0.3;
   (b) a receiver for converting said optical signals into electrical signals, said receiver having
      (i) a sensitivity in the range −40 dBm to −15 dBm
      (ii) a dynamic range between 10 dB and 20 dB, and
      (iii) a power consumption of less than 100 mW; and
   (c) an optical fiber linking said receiver and said transmitter, said fiber
      (i) being a multi-mode, optical fiber
      (ii) having an outside cladding diameter of 180–250 microns
      (iii) having a core diameter of 0.6 to 0.95 of the cladding diameter, and
      (iv) having a numerical aperture in the range 0.2–0.5.

2. A fiber optic link as claimed in claim 1, wherein said optical fiber has a cladding diameter of substantially 200 microns and said core diameter is in the range 160–180 microns.

3. A fiber optic link as claimed in claim 1, further characterized in that said optical fiber has a substantially step refractive index distribution.

4. A fiber optic link as claimed in claim 1, wherein said optical fiber has a numerical aperture of substantially 0.3.

5. A fiber optic link as claimed in claim 1, wherein the receiver has a sensitivity of substantially −35 dBm and a dynamic range of substantially 15 dB, and a power consumption of less than 50 mW.

6. A fiber optic link as claimed in claim 1, wherein said transmitter can produce −20 dBm of launched power in said optical fibre, has an extinction ratio of substantially 0.05 and has a power consumption of less than 75 mW.

7. A fiber optic link as claimed in claim 6, wherein said transmitter has a data rate range of 64 Kb/s to 100 Mb/s, preferably from 64 Kb/s to 50 Mb/s.

8. A fiber optic link as claimed in any previous claim, wherein the fiber has a length equal to or less than 200 meters, and includes no more than three fiber to fiber connectors, having a connector loss of less than 3.5 dB, preferably less than 2.5 dB.

9. A fiber optic link as claimed in claim 8, in which said transmitter and said receiver each have a short tail of optical fibre permanently connected thereto, said short tails of optical fiber interconnected by a length of optical fiber and connected thereto by means of demountable optical fiber connectors.

10. An electronic telephone exchange including:
   two time switches,
   a space switch,
   a functional connection between each time switch and the space switch such that the switches are arranged to switch voice traffic in a digital format or data in a digital format,
   one or both of said functional connections being at least one optical fiber link as claimed in claim 1 in which the transmitter converts electrical digital signals into optical signals and the receiver converts said optical signals into electrical digital signals.

11. An electronic telephone exchange as claimed in claim 10, further including means for encoding said optical signals into a low disparity biphase digital signal.

12. An electronic telephone exchange as claimed in claim 10, wherein the space switches and time switches are interconnected by a multiplicity of fiber optic links.

13. An electronic telephone exchange as claimed in any of claims 10–12, wherein the or each said fiber optic link carries ten digital channels serially coded, each digital channel having a data rate of substantially 4.096 Mb/s, eight of said digital channels carrying data or digitally encoded voice signals, one of said channels carrying signalling data, and one of said channels carrying a clock signal.

14. An electronic telephone exchange comprising:
   time switch means connected to provide plural first output digital electrical signal streams;
   multiplexing means connected to receive said plural first output digital electrical signal streams and to provide a first single serial stream of digital electrical signals;
   a fiber optic link as in claim 1 wherein, said transmitter includes an electrical-to-optical signal converter connected to receive said first serial stream of digital electrical signals and to provide a corresponding serial stream of digital optical signals; and first optical fiber tail means having a first end connected to optically receive said serial stream of digital optical signals and to transmit such optical signals to a second end;
   said optical fiber includes an optical fiber link means having first and second ends for transmitting opitical signals therebetween;
   said transmitter further includes a first fiber connector means for detachably and optically coupling the second end of said first optical fiber tail means to the first end of said optical fiber link means, and
   said receiver includes a second optical fiber tail means having first and second ends for transmitting optical signals therebetween; a second fiber connector means for detachably and optically coupling the second end of the optical fiber link to the first end of the second optical fiber tail means; and an optical-to-electrical signal coverter optically coupled to the second end of the second optical fiber tail means for receiving said serial stream of digital optical signals and for providing a corresponding second serial stream of digital electrical signals;
   demultiplexing means connected to receive said second serial stream of digital electrical signals and to provide plural second output digital electrical signal streams; and
   space switch means connected to receive said plural-second output digital electrical signal streams.

15. An electronic telephone exchange as in claim 14 further comprising coding and decoding means connected to cause all said serial streams of digital signals to be binary-valued and occurring in successive patterns which produce an approximately zero average value.

16. An electronic telephone exchange for selectively interconnecting incoming and outgoing telephone lines, said exchange comprising:
   first time switch means connected to receive incoming digital electrical signals from said incoming telephone lines;
   space switch means having input and output terminals and adapted to switch electrical signals therebetween;
   second time switch means connected to provide outgoing digital electrical signals to said outgoing telephone lines;
   a first optic fiber link as in claim 1 connected to said first time switch means for converting said incoming digital electrical signals to corresponding first digital optical signals transmitted over an optic fiber where these first optical signals are converted back to electrical form for processing by said space switch means; and
   a second optic fiber link as in claim 1 connected for converting electrical signals provided at the output terminals of said space switch means to corresponding second digital optical signals transmitted over an optic fiber to the second time switch means where these second optical signals are converted back to electrical form for processing by said second time switch means.

17. An electronic telephone exchange as in claim 16 further comprising coding and decoding means connected to cause all said serial streams of digital signals to be binary-valued and occurring in successive patterns which produce an approximately zero average value.

* * * * *